United States Patent

[11] 3,611,302

[72] Inventors Pier Mario Castello Rho, Milan; Giacomo Vercesi, Milan, both of Italy

[21] Appl. No. 747,921

[22] Filed July 26, 1968

[45] Patented Oct. 5, 1971

[73] Assignee General Electric Information Systems Italia S.p.A. Turin, Italy

[32] Priority July 28, 1967

[33] Italy

[31] 18906A

[54] HIGH SPEED MODEM SIMULATOR
8 Claims, 13 Drawing Figs.

[52] U.S. Cl. 340/172.5

[51] Int. Cl. G06f 3/00

[50] Field of Search 340/172.5; 235/157; 328/62

[56] References Cited

UNITED STATES PATENTS

| | | | |
|---|---|---|---|
| 3,048,785 | 8/1962 | Cartier | 328/62 |
| 3,308,439 | 3/1967 | Tink et al. | 340/172.5 |
| 3,373,418 | 3/1968 | Chan | 340/172.5 |
| 3,407,387 | 10/1968 | Looschen et al. | 340/172.5 X |

*Primary Examiner*—Paul J. Henon
*Assistant Examiner*—Sydney Chirlin
*Attorneys*—George V. Eltgroth and Joseph B. Forman

ABSTRACT: This invention relates to the interconnection of data-handling systems, which are remote from one another, by means of a modem simulator, the modem simulator including a synchronizing signal generator having means for adjusting the time ratio for the directional transmission of information signals between said data-handling systems.

BY George V. Eltgroth and Joseph B. Todman
Atty for INVENTORS
Piermario CASTELLO
Giacomo VERCESI BY George V. Eltgroth and Joseph J. Thomas
Attys for INVENTORS
Piermario CASTELLO
Giacomo VERCESI BY George V. Eltgroth and Joseph B. Dorman
Attys for INVENTORS
Piermario CASTELLO
Giacomo VERCESI BY George V. Eltgroth and Joseph B. Forman Attys for INVENTORS
Piermario CASTELLO
Giacomo VERCESI

HIGH SPEED MODEM SIMULATOR

The present invention relates to a device for high-speed data transmission between electronic digital computers separated by distances in the range of several hundred meters.

Two digital electronic computers may be interconnected by a transmission channel, which may take the form of a telegraphic, or telephonic line or a radio link. These means must be used when the computers to be interconnected are separated by a substantial distance and require an apparatus controlling the send-receive operations, called Controller, and a modulating and demodulating device called Modem for each computer. The controller is connected to the computer by a plurality of wires, over which information signals and control and check signals are transmitted in both directions. This plurality of connecting wires, each one of the wires being distinguished by the indication of the signal it carries, is referred to as the "computer-controller interface." The controller is in turn connected to the modem by a second plurality of wires, referred to as the "controller-modem interface." The modem transforms the sequence of direct current information signals, as received the controller, to a form suitable for line transmission (for instance, by amplitude or frequency-modulating a carrier wave) and transforms the signals received from the line, (for instance amplitude, or frequency modulated carrier waves) into a sequence of direct current signals which are sent to the controller.

An important function of the controller is to serialize the information signals, that is to transform the information signals, received in parallel form over a number of wires of the computer-controlled interface, into a temporal sequence of signals on a single wire of the controller-modem interface, and conversely to convert the temporal sequence of information signals, received over a single wire of the modem-controller interface to parallel signals and to distribute them in parallel over a suitable number of wires of the controller-computer interface. To perform these operations a sequence of time signals, usually generated by the modem, are used for controlling the time relationship of the different signals, Such signals are called clock signals and are generally originated by the modem and sent to the controller over wires of the modem-controller interface.

The speed of data transmission is necessarily limited by the characteristics of the transmission line, and may range from several tens of bits per second, to a maximum of some thousands of bits per second.

The aforesaid arrangement using data transmission channels must necessarily be used if the computers are separated by distances as small as a kilometer or less.

If the interconnected computers are close together, a computer-to-computer interface comprising a very large number of wires is used. This arrangement permits one to reach a very high rate of data interchange, in the order of a million bits per second: but, as such an arrangement requires a very large number of wires, having special characteristics, it is very expensive and cannot be used if the distance between computers is larger than a few tens of meters.

An object of the present invention is to provide means for interconnecting two computers located at a distance of the order of several hundreds of meters by a reduced number of wires, the transmission speed being in the order of hundred thousand bits per second.

This object is attained by means of an arrangement whereby both computers are provided with controllers as if they were to be connected through a pair of modems and a line. According to the invention, a device connected to both controllers by a reduced number of wires, provides for the interchange of information signals, and for delivering and accepting, to and from the controllers, the same control signals which are usually delivered and accepted by the modems. Specifically, the device according to the invention, which will be referred to as a modem simulator, also delivers the clock signals required for the operation of both controllers, adapting the same to their various characteristic requirements. More specifically, the said clock signals, which consist of a sequence of alternating time intervals of different logic levels, may be independently adjusted to provide a ratio of the time intervals to one another to meet the requirement of the different controllers and so maximize the speed of data interchange.

The modem simulator usually will be located near one of the computers and connected to the other one by a proper cable having the required number of wires.

The use of a device according to the invention is not limited to the interconnection between two computers, but may also be used, with convenient modifications, to connect a computer to one or more peripheral units, as for example high-speed printers, teleprinters, tape transport units, tape and card readers. It is therefore possible to locate such apparatus at a convenient distance from the central processor unit, as is often required.

These and other features and advantages of the invention will appear from the detailed description of a preferred embodiment thereof, with reference to the accompanying drawings, wherein.

Figure 1:
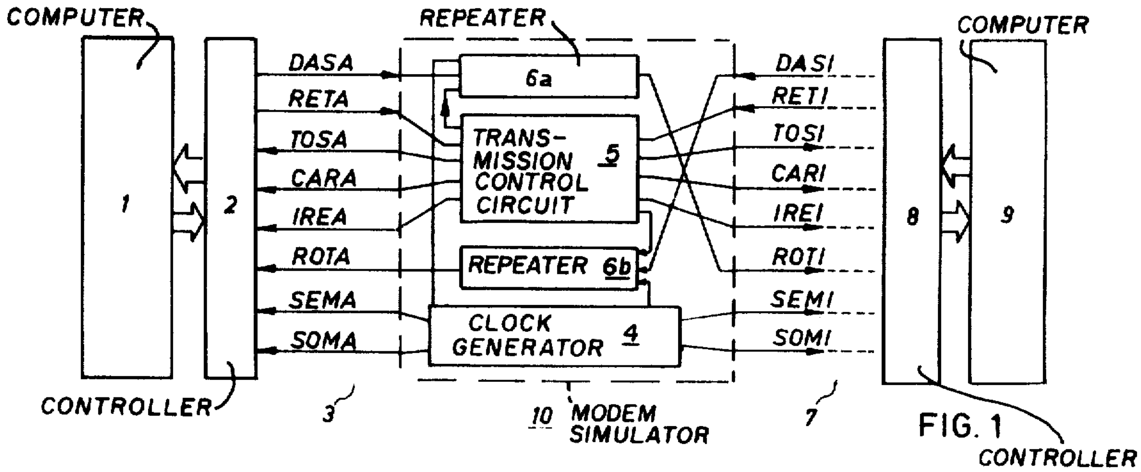
FIG. 1 is the block diagram of the modem simulator and the connected computers.

FIG. 1 shows the block diagram of the modem simulator, contained by the dashed lines, and designated as a whole by the reference numeral 10. It is connected, on one side, by means of interface 3, to the controller 2, which is in turn connected to the computer 1, and, on the other side, it is connected, by means of interface 7, to the controller 8 which is connected to computer 9.

The modem simulator is taken as located in the immediate proximity of one of the computers, for example 1, and connected to controller 8 of computer 9 by cables of proper length. Hereafter, devices, circuits and signals relating to interface 3, controller 2 and computer 1 will be designated as "local," whereas devices, circuits and signals related to interface 7, controller 8 and computer 9 will be designated as "remote." The modem simulator comprises:

—a circuit 4 for generating the clock signals

—a circuit 5 for controlling the interchange of signals in both directions

—two repeater circuits 6*a* and 6*b* for retransmitting the information signals respectively in either direction.

According to the preferred embodiment, the modem simulator will provide for transmission of data in each direction in alternatively interlaced time intervals according to the method of operation usually called "hald-duplex," characterized by the fact that, although two separate independent repeater circuits are available, one for each direction, only one of them is operating at any one time.

However, suitable modifications are provided in the interchange controlling circuit, to allow the use of the "duplex" mode of operation, that is, of the simultaneous data transmission in both direction.

In the preferred embodiment, interfaces 3 and 7 are substantially in agreement with the recommendations of the International Telegraph and Telephone Consulting Committee (C.C.I.T.T.). Some simplification has been introduced as required by the specific operating conditions, due to the fact that the modem simulator not only substitutes for the two modems at the ends of the transmission line but also substitutes for the line itself. Therefore, some commands and signals used in the case of actual line transmission are no longer required.

Each interface may be independently modified to be adapted to controllers which do not follow the C.C.I.T.T. recommendations.

Each interface consists of 8 wires, and, in addition, a ground wire and a common return wire which are not represented in FIG. 1. Each wire is designated by a coined designation which also indicates the wire terminals and the signal transmitted thereon.

The coined designation of wires and signals of interface 3 are listed, hereafter, with a short indication of their meaning and direction. It must be noted that the terms "emission" and "reception" and similar ones are always relative to controller: that is, a signal "emitted" is directed from the controller to the modem simulator, a signal "received" is directed from the modem simulator to the controller.

| Coined Designation | Meaning | Direction |
|---|---|---|
| DASA | Data emission | From controller to simulator |
| RETA | Request to send | From controller to simulator |
| TOSA | Permission to send | From simulator to controller |
| CARA | Prepare to receive | From simulator to controller |
| IREA | Simulator ready | From simulator to controller |
| ROTA | Data reception | From simulator to controller |
| SEMA | Emission clock | From simulator to controller |
| SOMA | Reception clock | From simulator to controller |

The remote interface 7 is identical to the local interface 3, but the designation of the wires and signals differ from the above indicated by ending with letter I in place of A.

The circuit of the simulator comprises substantially only three basic logic circuits, that is: a NOR circuit, a bistable multivibrator circuit, commonly called Flip-Flop, and a monostable multivibrator circuit, referred to as a Univibrator.

In the described embodiment, a positive voltage of approximately 5 volts represents the logical value ONE, and a voltage substantially equal to ground, that is 0 volts, represents the logical value ZERO. The circuits are fed by a single positive voltage, of about 20 volts. All transistors are of NPN type. It is obvious that different voltage values, either positive or negative, and different types of transistors or switching elements may be used.

The NOR circuit (FIG. 2) comprises a transistor 11 fed by the positive voltage +V through a resistor 12. The base of the transistor is connected to different input terminals $E_1E_2E_3$ and to ground, by means of resistors 13, 14, 15, 16. If at least one input E is at a logical level ONE, that is approximately +5 volts, the transistor is conducting, the output U is at a voltage substantially equal to 0 volts, that is, at logical level ZERO. The output is at level ONE only if all inputs are at level ZERO.

According to the notations of the Boolean algebra, if $a$, $b$, $c$, are the input values, the output value is the negated sum of the inputs, and also the product of the negated input values:

$$U=\overline{a+b+c}=\bar{a}.\bar{b}.\bar{c}.$$

Figure 2:
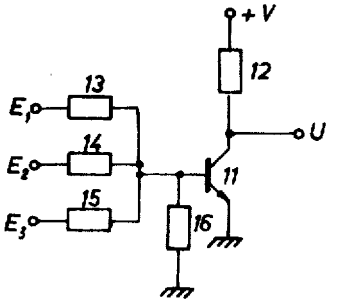
FIG. 2 is the simplified diagram of the NOR circuit and 2*a* is the symbol used for the same.

In FIG. 2 three inputs are represented, but the number may obviously be larger or smaller. If there is a single input, the circuit is a simple inverter, giving at the output the negated value of the input. The NOR circuit will be represented by the symbol shown in FIG. 2$a$.

Figure 3A:
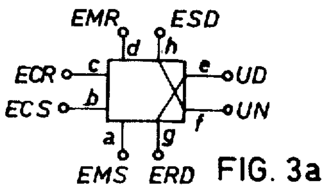
FIG. 3 is a simplified diagram of the bistable multivibrator circuit, and FIG. 3*a* the symbol used for the same.
Figure 3:
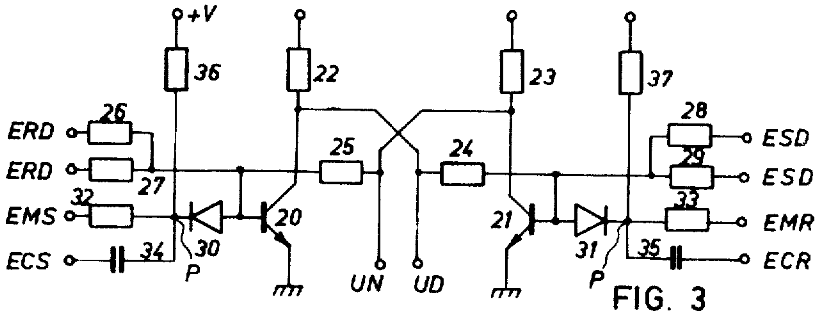

The bistable multivibrator circuit, or flip-flop, is obtained by means of the interconnection of two NOR circuits. It comprises two transistors 20 and 21 (FIG. 3). The collector of transistor 20 is connected to the base of transistor 21 through a resistor 24 and the collector of transistor 21 is connected to the base of transistor 20 through a resistor 25.

In these conditions, if transistor 20 is conducting its collector is substantially at 0 volts, and the base of transistor 21 is also at substantially 0 volts, so that transistor 21 does not conduct, that is, transistor 20 is on, and transistor 21 is off. The collector of transistor 21 is at a voltage of approximately 5 volts, and this voltage, applied through resistor 25 to the base of transistor 20, holds it in on condition. This first stable condition of the flip-flop will be called ZERO condition; the output UD is at level ZERO, the output UN at level ONE. If transistor 20 is off, and consequently transistor 21 is on, the flip-flop will assume the second stable condition, that is, the ONE condition, in which output UD is at level ONE, output UN is at level ZERO.

A signal that causes the flip-flop to switch from ZERO to ONE is called a SET signal, a signal that causes the flip-flop to return to the ZERO condition is a RESET signal. The inputs to the flip-flop are called SET or RESET inputs, according to whether a proper signal, applied to them, sets the flip-flop to ONE, or resets it to ZERO.

The inputs to the flip-flop are distinguished as direct or conditioned inputs. Direct inputs, as indicated by ERD and ESD in FIG. 3, are directly connected respectively to the bases of transistors 20 and 21. If the flip-flop is in ZERO condition, that is, if transistor 21 is off, a level ONE signal applied to input ESD causes the transistor 21 to conduct, and thus sets the flip-flop to the ONE condition. On the contrary if the flip-flop is in ONE condition, that is, if transistor 20 is off, level ONE applied to input ERD causes the transistor 20 to conduct, and resets the flip-flop to the ZERO condition.

An input circuit for a conditioned SET signal, and another for a conditioned RESET signal are provided. Each one comprises a masking input (respectively EMS and EMR) a masked input (ECR and ECS) a diode (30 resp. 31) a capacitor (34 resp. 35) a resistor (36 resp. 37). As may be readily seen, a negative going front, that is, the transition from a level ONE to a level ZERO of the signal applied to input ECS is transmitted as a negative pulse through capacitor 34 and may reach the base of transistor 30 through the diode 30, turning transistor 20 off, and setting the flip-flop. However this may happen only if the masking input EMS is at level ZERO, that is, if the point P is substantially at voltage ZERO. If EMS is at level ONE, what is, at a voltage of approximately 5 volts, point P is also at a substantially positive voltage, diode 30 is inversely biased, and the negative pulse transmitted through capacitor 34 is unable to reach the transistor 20. As a result, a negative going front applied to input ECS may act as a SET signal only if a ZERO level is applied to EMS. Conversely, a negative-going front applied to masked reset input ECR may act as a reset signal only if a level ZERO is applied to the masking input EMR. FIG. 3$a$ shows the symbol used for the flip-flop circuit.

The univibrator circuit is a circuit which is normally in the ZERO condition, and may be driven to an unstable ONE condition by means of a set signal. It remains in the unstable ONE condition for a time interval dependent upon the characteristics of the circuit, and then returns to the stable ZERO condition. As a result it is able to generate, at its output, a pulse of predetermined and adjustable duration. It comprises (FIG. 4) two transistors 41 and 42 whose collectors are fed by voltage +V through resistors 43 and 44. The collector of transistor 42 is connected to the base of transistor 41 through a capacitor 45, and to ground through an adjustable resistor 47. The collector of transistor 41 is connected to base of transistor 42 through a resistor 44. The conditioned input circuit comprises masking input EMU and masked input ECU, capacitor 50, resistors 49 and 40, and diode 48. In the ZERO condition, transistor 41 is conductive, thus the output UU is at approximately 0 volts, and this voltage is applied through resistor 44 to the base of transistor 42, maintaining it in off condition. Capacitor 45 is charged by the positive voltage at the collector of transistor 42, applied to one terminal, the other terminal being at 0 volts.

The positive charging voltage may be adjusted by means of variable resistor 47. If a negative-going front is applied to masked input ECU, the masking input being at ZERO level, transistor 41 is turned off, its collector reaches a positive voltage which, applied to the base of transistor 42, turns the transistor on. The voltage of the collector of transistor 42 goes abruptly to 0 volts and this negative voltage swing is transferred through capacitor 45 to the base of transistor 41, holding it in the off condition even after the end of the SET pulse. The capacitor now discharges through resistor 42, and after a predetermined time interval the voltage of the base of transistor 41 reaches a small positive value which turns the transistor 41 on, thus the univibrator returns to the ZERO condition. This predetermined time depends upon the values of resistor 42 and capacitor 45, and also upon the amplitude of voltage swing which has been transmitted through capacitor 45, and therefore it is adjustable between definite limits by adjusting the value of resistor 47, which controls the value of the voltage at the collector of transistor 42 in the ZERO condition.

Figure 4:
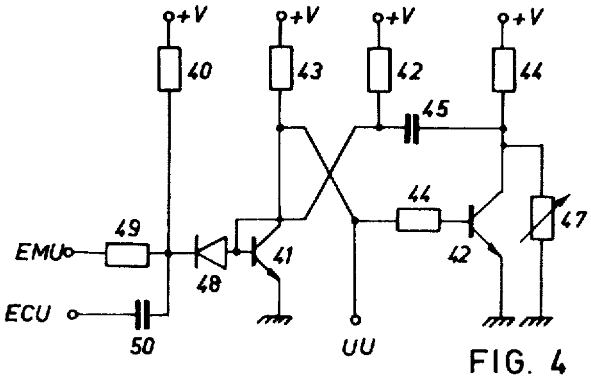
FIG. 4 is the simplified diagram of the univibrator circuit and FIG. 4*a* the symbol used for the same.
Figure 2A:
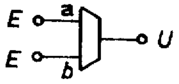
Figure 4A:
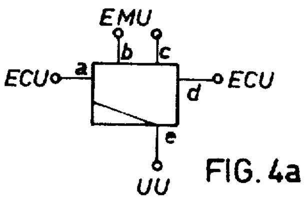

During the time interval when the univibrator is in the ONE condition, the output UU is at level ONE. The univibrator thus generates, at its output UU, a level ONE signal of definite and adjustable duration. If such signal is applied to the masked input of a second univibrator, whose masking input is at ZERO level, the negative going front at the end of the said signal sets the second univibrator to the unstable ONE condition, thus generating at its output a level ONE signal whose duration is determined by the characteristics of the second univibrator. If the signal generated by this second univibrator is applied to the input of the first univibrator, a circuit, which is capable of oscillating at a predetermined frequency, generating at both its outputs a succession of alternative ONE and ZERO levels, whose respective duration may be independently adjusted, is obtained. FIG. 4 shows the symbol used for the univibrator.

In the following description of the logic circuits and their operation, the expression presence of signal on a wire or on a terminal means that the wire or terminal are at level ONE, and absence of a signal will mean that the same are at level ZERO. The signals are indicated by the coined designations listed above. When their logic value is inverted, that is, when the signal is negated, a letter N is added to the name.

Figure 5:
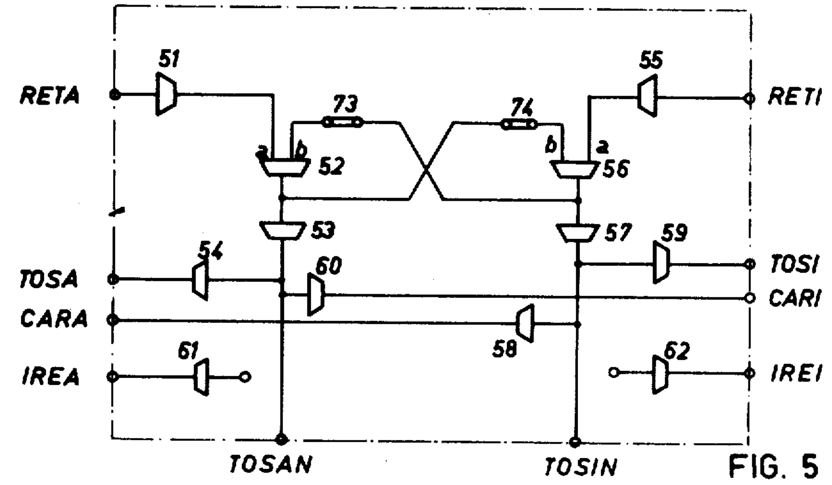
FIG. 5 is a logical block diagram of the transmission control circuit.

FIG. 5 represents the logic block diagram of the transmission control circuit 5 of FIG. 1. The only logic circuit employed is the NOR circuit. The case of the half-duplex operation will be illustrated.

When the power supply of the modem simulator is on, NOR circuits 61 and 62 invert the level ZERO constantly applied to their inputs, and produce level ONE signals to terminals IREA and IREI, which indicate to local controller 2 and remote controller 8 that the simulator is in operative condition.

In rest conditions, terminals RETA and RETI are at ZERO level, and correspondingly inputs *a* of NOR 52 and 56 are at level ONE. Their outputs are at ZERO level, and at the same time their inputs *b* are at level 0, as each one is connected to the output of the other NOR. The NOR circuits 53 and 57 generate a level ONE at their outputs which are connected respectively to terminals TOSAN and TOSIN. By effect of further inversions due to NOR circuits 54 and 60, and respectively 58 and 59 terminals TOSA and CARA of local interface 3 and TOSI and CARI of remote interface 7 are at level ZERO.

When, for example, controller 2 is required to transmit data, it applies a ONE signal to terminal RETA, as "request to send." Consequently a ZERO level is applied to input *a* of NOR 52. As input *b* is also at ZERO level, the output level becomes ONE. This level, applied to input *b* of NOR 56, holds the output of NOR 56 to ZERO level, regardless of the value applied to input *a*. Through the double inversion due to NOR 53 and 54, terminal TOSA goes to the ONE level, and as a result controller 2 receives the signal "permission to send." Terminal CARI also goes over to the ONE level, and the remote controller receives the signal "prepare to receive." Controller 2 initiates the sending of the data on wire DASA. In this condition a "request to send" RETI, incoming from the remote controller 8 brings input *a* of NOR 56 to the ZERO level, but its output remains ZERO, because its input *b* is ONE. Therefore terminal TOSI remains at ZERO level, and remote controller 8 does not receive any "permission to send" signal.

When the data transmission by controller 2 is terminated, RETA returns to ZERO, as does input *b* of NOR 56. A "request to send" signal RETI from the remote controller, as shown, causes the emission of a "permission to send" signal TOSI to the remote controller and a "prepare to receive" signal CARA to the local controller, and the emission of a "-permission to send" signal TOSA to controller 2 is prevented.

Removing the jumpers 73 and 74 the interlock between NOR 52 and NOR 56 is also removed, and duplex operation, in case the controllers are predisposed thereto, may take place.

Figure 6:
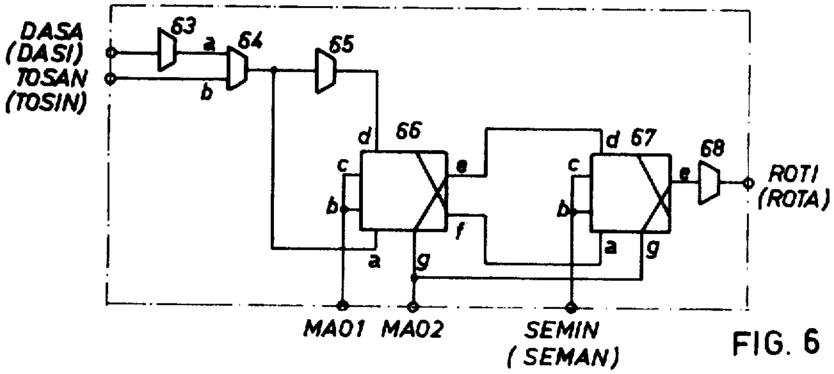
FIG. 6 is the logical block diagram of the repeating circuit.

FIG. 6 represents the logical block diagrams of repeater circuits 6*a* and 6*b* of FIG. 1. These circuits are identical and provide for the retransmission of the data signals from local interface 3 to remote interface 7 and vice versa, under control of clock signals.

Considering the repeater circuit of 6*a* of FIG. 1, the non-bracketed signal designations are valid. The information signals DASA are a succession of levels ONE and ZERO carrying the intelligence to be transmitted. They are inverted by NOR 63 and applied to input *a* of NOR 64, to whose input *b* the signal TOSAN is applied. As a result, the output of NOR 64 repeats and inverts the DASAN signals only if TOSAN is at ZERO level, that is, if a signal TOSA (permission to send) is received by local controller 2 and a signal CARI (prepare to receive) is sent to controller 8.

The logical elements 66 and 67 are two flip-flops as described above. They are provided with a direct RESET input *g* and two conditioned input circuits, whereby *a* and *d* are respectively the SET and RESET masking inputs, and *b* and *c* the SET and RESET masked inputs. Terminal *e* is the direct output, terminal *f* the negated one.

The DASA signals are applied to input *a* of flip-flop 66, and the inverted DASAN signals coming out of NOR 65 are applied to terminal *d*. As a result, a ZERO level, is alternatively applied either to the SET or to the RESET inputs. A clock signal MAO 1 is applied to masked input *b* and *c*, the negative going fronts of the clock signals, equally distanced in time, causing the flip-flop 66 to switch from ONE to ZERO and vice versa, at predetermined equally spaced intervals of time. Signals DASAN and DASA are thus respectively present at output *e* and *f* of flip-flop 66 and are applied to the masking terminals *d* and *a* of flip-flop 67, to whose masked inputs a second clock signal SEMIN is applied. The direct output *e* will yield the inverted signals DASAN, which, applied to the input of NOR 68 emerges as signal ROTI, that is, the information signals received by remote controller 8.

The direct reset inputs *g* of flip-flop 66 and 67 are connected to a terminal MAO2 to which a signal, produced by the clock circuit, is applied, for resetting both flip-flops before starting any emission.

The circuit 6*b* of FIG. 1, for retransmitting the information signals from remote controller 8 to local controller 2 is identical to the circuit of FIG. 6. The bracketed designations are valid in this case.

Circuit 4 is the clock generating device, which generates the different clock signals used for synchronizing the operation of the different parts of the device. In particular it generates the four synchronizing signals which are sent over the interface to both controllers. Signal SOMA is the clock signal for reception by controller 2; SEMA the clock signal for the transmission from local controller 2; SOMI and SEMI the respective clock signals for reception and transmission by remote controller 8.

In the case of actual line transmission, the clock signals provided by the modem and controlling the sending and receiving processes in the controller are symmetrical in shape, that is, the ONE and ZERO intervals have equal duration. According to the invention, the clock signals may be dissymmetrical, and the measure of this dissymmetry is independently adjustable for each one of the four clock signals. This allows the use of both the rising and falling front of each signal for controlling different functions at the most convenient instants in time, thus permitting the attainment of maximum speed of transmission with maximum economy of means.

Figure 7:
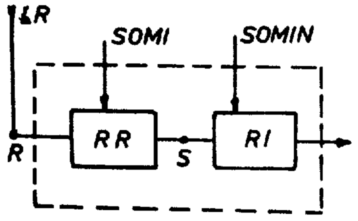
FIG. 7 is a schematic representation of a line termination of a controller.
Figure 8:
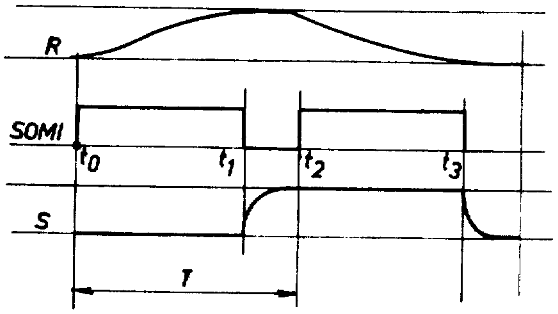
FIG. 8 shows the form of the signals at different points of said termination.

An example of the convenience of this dissymmetry is shown by FIG. 7 and 8. In FIG. 7 the receiving line termination of the remote controller is summarily indicated. The receive line LR terminates in a single bit register RR which at a predetermined time stores the logic value present on the line. Such logic value is afterward transferred to a register RI to free register RR to receive the following value on the line. It may be safely assumed that the time constant of the line is substantially greater than the time constant of the register RR, that is, that the time employed by the voltage at point R, at the end of the line, to reach its final value is longer than the time necessitated by the voltage at point S, the output of register RR, to reach the final value. The dissymmetry of the clock signal allows the use of both fronts of the clock signal SOMI to control different function, for example, the falling front for controlling the loading of the logic value present on the line into register RR, and the rising front to load the logic value present at the output S of register RR into register RI. This is represented in FIG. 7 by the control inputs marked SOMI and SOMIN.

The first diagram of FIG. 8, shows the voltage at point R. It is assumed that, given a level ONE signal following a level ZERO signal, the voltage starts rising at time $t_o$, and reaches its final value at instant $t_1$. At this time the falling front of signal SOMI, shown in the second diagram, controls the loading of the value ONE into the register RR. The voltage at output S of this register starts rising along a much steeper curve, so that at point $t_2$ its maximum value is reached, the interval $t_1t_2$ being shorter than the interval $t_ot_1$. At this point in time the rising front of signal of signal SOMI takes place, controlling the loading of register RI. The new falling front of signal SOMI will occur at instant $t_3$, the interval $t_2t_3$ being such, as to allow the voltage at R to reach its new maximum value, for instance ZERO.

The intervals $t_o$, $t_1$, $t_2t_3$ are determined by the condition and characteristics of the line. If the clock signal were symmetric, either the full period of the clock signal SOMI would be double that interval, thus substantially reducing the speed of transmission, or an additional clock signal would be provided for controlling the loading of register RI.

What has been shown above is only one example of a condition wherein the dissymmetry of the clock signal is useful for economy and speed. In other cases the dissymmetry may be useful for economically meeting the synchronizing requirement of the different logical devices of the controller and related equipment.

Figure 9:
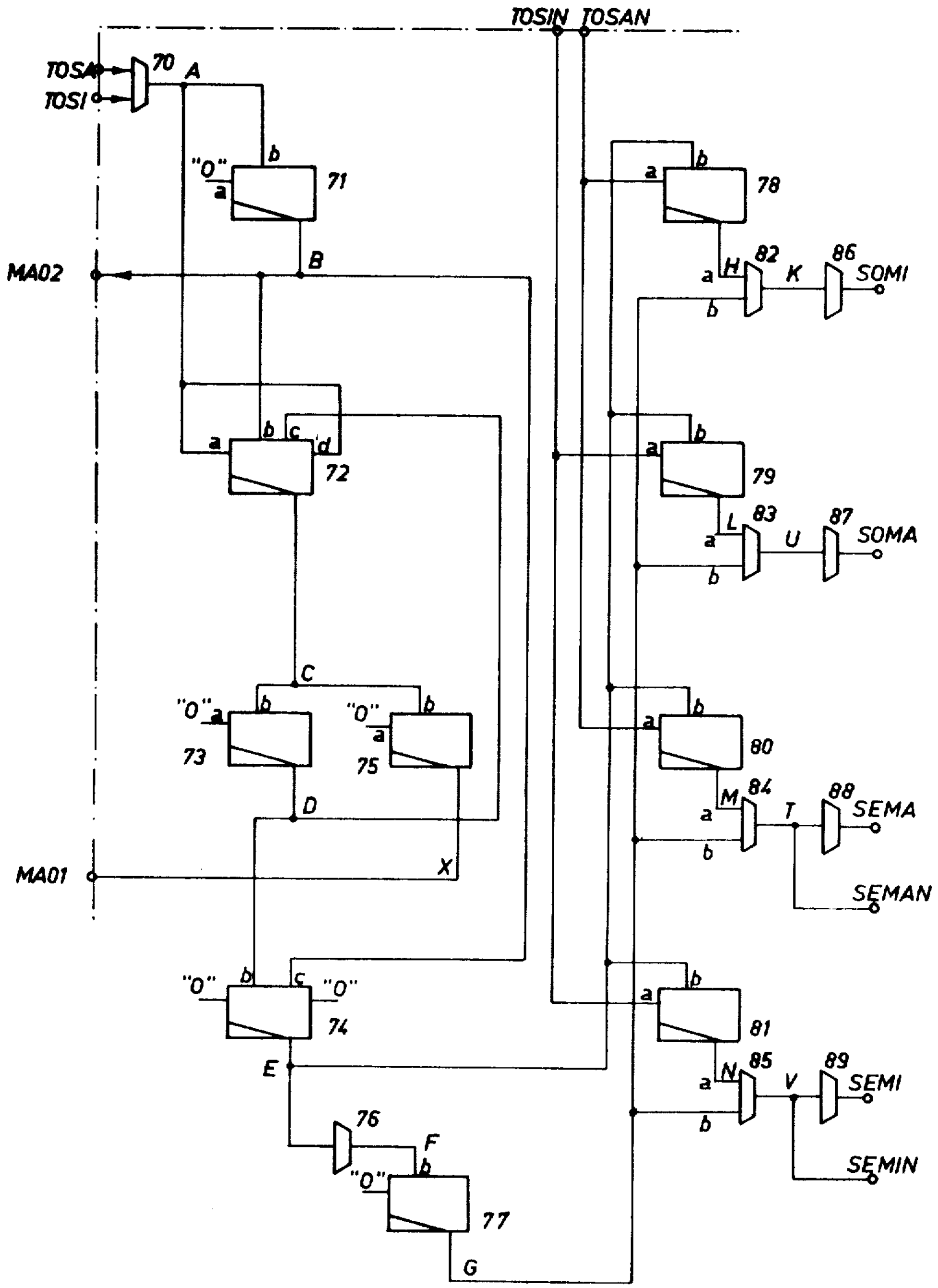
FIG. 9 is the logical block diagram of the clock generator circuit.

FIG. 9 shows the logic block diagram of the clock generating circuits. The logic elements used are the univibrator circuits and the NOR circuits. The univibrators are provided with at least a conditioned input circuit comprising a masking input *a* and a masked input *b*. If only the masked input *b* is used, it is intended that the masking terminal is permanently connected to ground, that is to 0 volts, thus enabling the operation of the univibrator to be controlled by a negative going front applied to terminal *b*.

Figure 10:
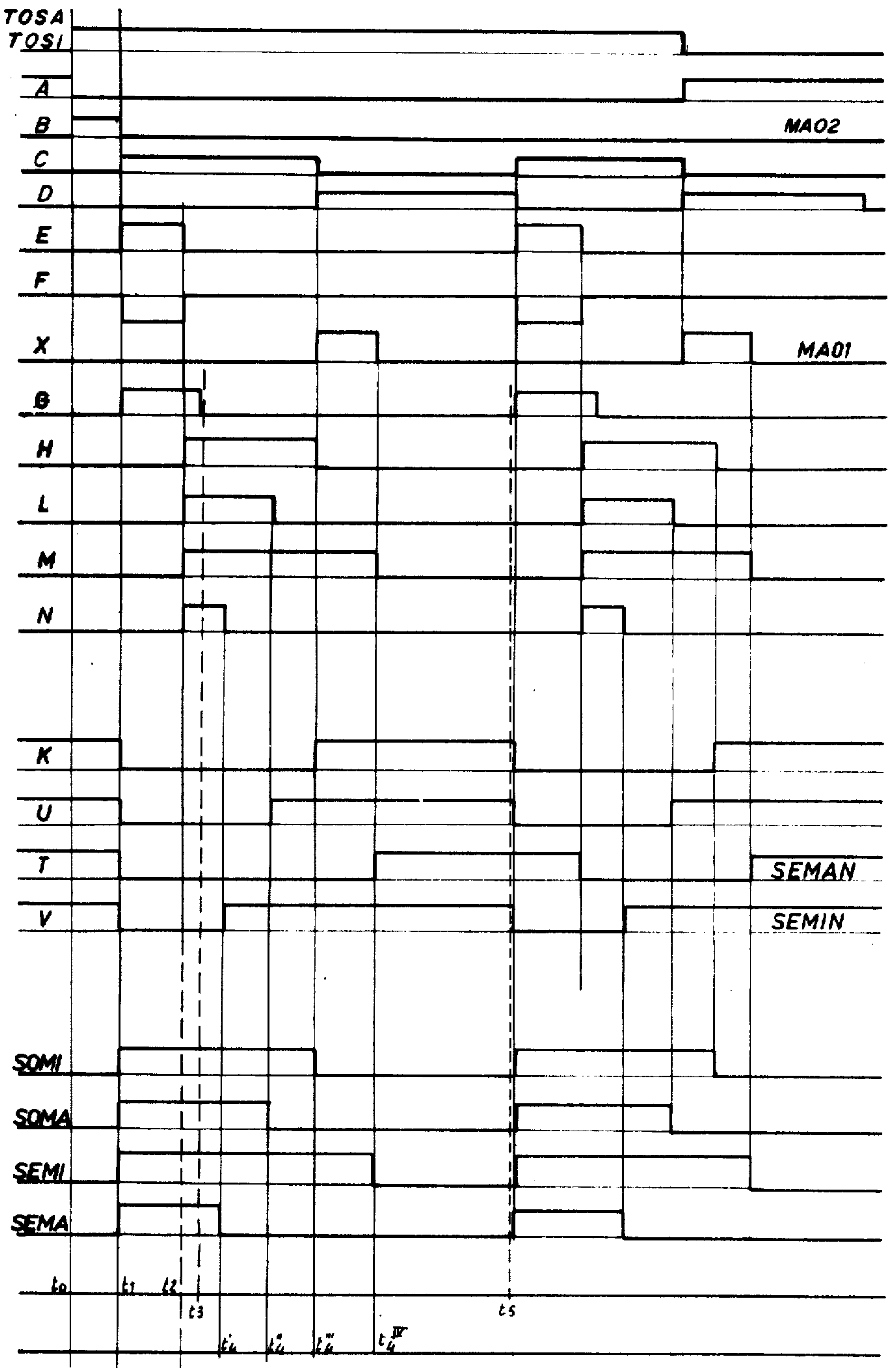
FIG. 10 shows the diagrams of the different signals in different points of the clock generator circuit.

The temporal relationships of the different signals are best illustrated in the diagrams of FIG. 10, wherein each diagram indicated by a capital letter shows the signal present at the point indicated in FIG. 9 by the same capital letter.

Signals TOSA and TOSI are applied to inputs *a* and *b* of NOR 70, whose output value becomes ZERO if either one input or the other becomes ONE, that is, if either one controller or the other receives permission to send. The transition from ONE to ZERO at point A, connected with input *b* of univibrator 71 generates, at its output B, a signal of predetermined length, that is signal MAO2 which, as shown above, resets the flip-flop circuits 66 and 67 of the repeater circuit in FIG. 6.

The same signal is applied to masked input *b* of univibrator 72, to whose masking input *a* the signal present at point A, which now is ZERO, is applied.

Univibrator 72 generates, at point C, a signal of predetermined length. This signal is applied to the masked inputs *b* of both univibrators 73 and 75. The negative going front of the signal at C causes the operation of univibrators 73 and 75 and the appearance of two signals of predetermined length at their outputs D and X. The signal in D is applied to the second masked input *c* of univibrator 72, whose masked input *d* is controlled by the signal at point A. The mutual action of univibrators 72 and 73 provides, at point D, a signal comprising an alternation of levels ONE and ZERO, having a length depending on the characteristics and adjustments of univibrators 72 and 73. These adjustments are so made, that the ONE and ZERO intervals are substantially equal in length, and the period of the oscillation is equal to the time required for the transmission of a bit. This is the master clock signal.

If TOSA and TOSI return to ZERO, that is, when data transmission is terminated, point A level goes to ONE and this causes the univibrator 72 to stop after resetting so that the master clock signal ceases.

The master clock signal present at point C, and therefore at terminal *b* of univibrator 75, causes the periodical generation of a level ONE signal at point X, that is, signal MAO 1, which, as shown above, controls the operation of flip-flop 66 of the circuit of FIG. 6.

The signals at points B and D are applied to the masked inputs *b* and *c* of univibrator 74, which, as shown in FIG. 10, will commence oscillation at the same time as the falling front of signal MAO 2, and thereafter, will continue to oscillate under control of the falling fronts of the master clock signal. The signal at output E is inverted by NOR 76 and applied to masked input *b* of univibrator 77. The rising fronts at point E are changed to falling fronts at point F, and cause the univibrator 77 to oscillate and to generate ONE levels of predetermined length at output G. As may be seen by reference to FIG. 10, the rising fronts of signals at point G and E coincide in time, whereas the falling fronts are dependent upon the characteristics and adjustments of the respective flip-flops 74 and 77. The ONE levels in G have a slightly longer duration than the corresponding ONE levels in E.

Signal E is applied to the masking inputs of four univibrators 78, 79, 80 and 81.

Signal TOSAN, which is ZERO when the controller 2 is authorized to transmit, is applied to inputs *a* of univibrators 78 and 80. These two univibrators originate, as hereafter will be explained, the clock signals SOMI, which controls the reception of remote controller 8, and SEMA, controlling the transmission by local controller 2.

Similarly, signal TOSIN, which is ZERO when remote controller 8 is authorized to transmit, is applied to masking inputs *a* of univibrators 79 and 81. These generate clock signal SOMA, controlling the reception of local controller outputs and SEMI, controlling the transmission by remote controller 8. Each one of these four univibrators is adjusted to obtain the required degree of dissymmetry in the emitted clock signals.

When signal TOSAN is ZERO, the falling front of the signal in E is applied to masking input *b* of univibrators 78 and 80, and causes a succession of ONE signals to be generated at outputs H and M, the rising front of such signals coinciding with the falling front of the signal in E, and their duration being determined by the adjustment of the univibrators. Signals H and M are applied to inputs *a* of NORs 82 and 84, to whose inputs *b* signal G is presented.

The rising fronts cause the outputs K and T of NORs 82 and 84 to go to ZERO. Signal G becomes ZERO after signal E has reached ZERO, that is, when the signals ONE at outputs H and M of univibrators 78 and 80 have become ONE. Therefore outputs K and T of NORs 82 and 84 remain at ZERO until univibrators 78 and 80 return to ZERO. At this time, inputs *a* of NORs 82 and 84 also reach ZERO and cause the outputs K and T of said NORs to become ONE. The signals at output K and T thus comprise a level ZERO starting at the same time as the rising front of signal E, and terminating in accordance with the adjustments of univibrators 78 and 80. These signals, inverted by NORs 86 and 88 form the signals SOMI and SEMI which are to be sent respectively to remote controller 8 and local controller 2. The signal at point V, is the signal SEMAN which synchronizes flip-flop 67 of the circuit of FIG. 6.

In the same way, univibrators 79 and 81, controlled by signal TOSIN, only operate if remote controller 8 is authorized to transmit. They generate, at points L and N, signals of level ONE having a duration determined by the adjustment of said univibrators. These signals, applied to inputs *a* of NOR 83 and 85, to whose inputs *b* the signal G is applied, generate in U and V signals having a level ZERO of predetermined duration, which, inverted by NOR 87 and 89, give out signals SOMA, for synchronizing the local controller reception, and SEMI, for synchronizing the remote controller transmission. The inverted signal SEMIN controls the operation of flip-flop 67 of the circuit of FIG. 6.

What is claimed:

1. Apparatus for interconnecting at least two data handling systems remote from one another, each system including a data exchange controller, each of said controllers being responsive to synchronizing signals to receive and to transmit binary data signals; said apparatus comprising a modem simulator intermediate said data handling systems, said modem simulator including generating means for generating synchronizing signals, circuitry responsive to said synchronizing signals for controlling the timing of the interchange of data signals in both directions between said data handling systems, repeater circuits responsive to said synchronizing signals for retransmitting data signals received at said modem simulator, and connection means interfacing said modem simulator and said controllers of said respective data handling systems.

2. Apparatus according to claim 1 wherein said generating means generates successions of alternative synchronizing signal levels having a fixed frequency for controlling the transmission of data signals between said data handling systems.

3. Apparatus according to claim 2 further including means for adjusting the ratio of duration of said alternative signal levels.

4. Apparatus for controlling the transmission of binary data signals between first and second data exchange controllers, each of said controllers being responsive to synchronizing signals for receiving and for transmitting said data signals, comprising: a first repeater for receiving data signals transmitted by said first controller and responsive to synchronizing signals applied thereto for transmitting the data signals received thereby to said second controller, a second repeater for receiving data signals transmitted by said second controller and responsive to synchronizing signals applied thereto for transmitting the data signals received thereby to said first controller, means coupling said first repeater to receive data signals transmitted by said first controller and to transmit data signals to said second controller, means coupling said second repeater to receive data signals transmitted by said second controller and to transmit data signals to said first controller, a synchronizing signal generator for generating first and second pairs of synchronizing signals, means coupling one signal of said first pair to said first controller to control the time of transmission of data signals therefrom and the other signal of said first pair to said second controller to control the time of receipt of data signals thereby, and means coupling one signal of said second pair to said second controller to control the time of transmission of data signals therefrom and the other signal of said second pair to said first controller to control the time of receipt of data signals thereby.

5. The apparatus of claim 4 wherein each of said synchronizing signals comprises repetitive pairs of alternate voltage levels, and wherein adjusting means is provided for independently varying the ratio of the durations of the alternate levels of each of said voltage level pairs.

6. The apparatus of claim 5 wherein all of said synchronizing signals have a like frequency of the voltage level pairs thereof.

7. The apparatus of claim 4 further comprising means for coupling said one signal of said first synchronizing signal pair to said first repeater and for coupling said one signal of said second synchronizing signal pair to said second repeater.

8. The apparatus of claim 5 further comprising means for coupling said one signal of said first synchronizing signal pair to said first repeater and for coupling said one signal of said second synchronizing signal pair to said second repeater.